United States Patent
Shimanuki et al.

(10) Patent No.: US 6,713,204 B2
(45) Date of Patent: Mar. 30, 2004

(54) FUEL CELL SYSTEM (75) Inventors: Hiroshi Shimanuki, Saitama (JP);
Yoshio Kusano, Saitama (JP);
Toshikatsu Katagiri, Wako (JP);
Motohiro Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 108 days.

(21) Appl. No.: 10/056,643

(22) Filed: Jan. 23, 2002

(65) Prior Publication Data

US 2002/0119356 A1 Aug. 29, 2002

(30) Foreign Application Priority Data

Jan. 23, 2001 (JP) .................................... 2001-013916

(51) Int. Cl.$^7$ ............................................. H01M 8/04
(52) U.S. Cl. ................................... 429/26; 429/34
(58) Field of Search ................................ 429/26, 34

(56) References Cited

U.S. PATENT DOCUMENTS

2002/0098395 A1 * 7/2002 Shimanuki et al. ........ 429/26 X
2002/0160240 A1 * 10/2002 Matsui et al. ............. 429/26 X

FOREIGN PATENT DOCUMENTS

JP          07-071795          3/1995

* cited by examiner

Primary Examiner—John S. Maples
(74) Attorney, Agent, or Firm—Lahive & Cockfield, LLP (57) ABSTRACT

The present invention provides the fuel cell system, in which the decrease in the power generation and the degradation of the durability of the fuel cell can be prevented even if the temperature of fuel cell is low at starting or the ambient temperature is low. On the fuel cell starting electric power generation, the air supplied to the cathode inlet is humidified by the hollow fiber membrane humidifier and the hydrogen gas supplied to be anode inlet is humidified by another hollow fiber membrane humidifier. The cooling fluid of the cooling line, which absorbs the heat from the fuel cell and flows into the heat exchanger, heats the hollow fiber membrane humidifiers. Thus the humidification is promoted by heating the humidified air and hydrogen gas to raise their dew-point temperatures.

8 Claims, 4 Drawing Sheets

FUEL CELL SYSTEM

FIELD OF THE INVENTION

The present invention relates to a fuel cell system, which supplies the fuel gas containing hydrogen and the oxidant gas containing oxygen to generate electric power with the chemical reaction between the hydrogen and oxygen, and more particularly relates to a fuel cell system having a heating device for the humidified fuel and oxidant gases.

BACKGROUND OF THE INVENTION

Various types of electric vehicles have been developed recently, on which a traction motor is mounted instead of the conventional engine. As one example of these types of electric vehicles, fuel cell vehicles have been developed rapidly, on which a hydrogen ion exchange membrane fuel cell (hereinafter referred to as PEM fuel cell) that is shortly referred to as PEMFC (Proton Exchange Membrane Fuel Cell) is mounted as the power source for the traction motor.

The PEM fuel cell has a stack structure, in which a large number of cells, its of power generation, are stacked. Each cell interposes a membrane-electrode joint called MEA (membrane Electrode Assembly) between the anode separator with hydrogen supplying path and the cathode separator with oxygen supplying path. The MEA has the anode electrode catalyst layers and the gas diffusion layers layered alternately on one side, and the cathode electrode catalyst layers and the gas diffusion layers layered alternately on the other side of the hydrogen ion exchange membrane of solid polymer material called PEM (Proton Exchange Membrane).

In this type of PEM fuel cell, the humidified hydrogen gas as a fuel gas flows through the hydrogen supplying path from the anode inlet to outlet, and the humidified air as an oxidant gas flows through the oxygen supplying path from the cathode inlet to outlet. Then the hydrogen ions travel from the anode to cathode of each cell, permeating the PEM (ion exchange membrane) of the moistened MEA to produce the electric power of about 1 volt. In this case the PEM fuel cell is capable of producing electric power most stably under the temperature of 70 to 80 degrees Celsius.

The fuel cell system with the PEM fuel cell having the mechanism of power generation described above has the following means to control the temperature of the fuel cell as well as to continue power generation by the continuous supply of the humidified air and hydrogen gas: an air supply line for cooling the air by the intercooler, which is forcefully fed by the supercharger, and supplying it to the cathode inlet; an air discharge line for discharging the moisture rich residual air from the cathode outlet; a hydrogen gas supply line for supplying the stored hydrogen gas to the anode inlet: a hydrogen gas discharge line for discharging the moisture rich residual hydrogen gas from the anode outlet; one humidifying apparatus of water permeable membrane for humidifying the air of the air supply line by means of the moisture exchange with the moisture rich residual air of the air discharge line; another humidifying apparatus of water permeable membrane for humidifying the hydrogen gas of the hydrogen gas supply line by means of the moisture exchange with the moisture rich residual hydrogen gas of the hydrogen gas discharge line; and a cooling line for controlling the temperature of the fuel cell by circulating the cooling fluid between the fuel cell and the heat exchanger.

In this connection, a humidifier of light and compact hollow fiber membrane (see Japanese Laid-Open Patent 7-71795) is generally used for the humidifying apparatus of water permeable membrane described above. As the means of humidifying the hydrogen gas of the hydrogen gas supply line, an ejector is also employed to suck the moisture to the hydrogen gas supply line, which flows into the hydrogen gas discharge line. On the other hand, as the cooling line described above, a two-stage cooling is generally used to prevent the liquid junction of the fuel cell, in which the aqueous solution of ethylene glycol series, electrically non-conductive, is circulated as first cooling fluid between the fuel cell and the first heat exchanger of fluid-fluid type, and the second cooling fluid is circulated between the first heat exchanger and the second heat exchanger (radiator) of gas-liquid type.

The humidifier of hollow fiber membrane described above has a hollow fiber membrane module, which contains a large number of the water permeable hollow fiber membranes in a bundle in a cylinder-like housing, and head blocks connected to the respective ends of the module. In this type of hollow fiber membrane humidifier, the dry air of the air supply line flows as a sweep gas from one to another head block through the cylinder-like housing. Simultaneously, the moisture rich residual air of the air discharge line flows inside the respective hollow fiber membranes of a bundle as a cathode off-gas in the opposite direction. The moisture rich residual air of the air discharge line is dehumidified and the dry air of the air supply line is humidified by the moisture exchange between the former passing inside the respective hollow fiber membranes and the latter passing over the outer circumferential surfaces of the respective hollow fiber membranes. The porous hollow fiber membrane, which is permeable to the moisture in the gas by capillary condensation, is generally used for the hollow fiber membrane described before, since it has a good feature of high beat resistance. The non-porous hollow fiber membrane (ex. NAFION (RTM) of Du Pont) is also used, which is permeable only to the moisture in the gas by ion hydration.

The performance of power generation of the fuel cell system will diminish, when the temperature of the fuel cell is low at starting and the temperature of the air supplied to the cathode inlet by the air supply line is low. Especially when the ambient temperature is low, a problem of remarkable decrease in the power generation of the fuel cell will occur, since the temperature of the air supplied to the cathode inlet falls further and the humidification decreases owing to the fall of dew-point of the humidified air. Another problem that the durability of the fuel cell is degraded will occur. On the other hand, when the hydrogen gas of the hydrogen gas supply line is humidified by the ejector for water suction, the same problems described above will occur in the case of the fuel cell starting or the low ambient temperature, since the temperature of the hydrogen gas supplied to the anode inlet falls due to the latent heat of vaporization resulting from the ejector operation.

SUMMARY OF THE INVENTION

The object of the present invention is to provide a fuel cell system, which is capable of preventing the decrease in the power generation of the fuel cell and further the degradation of durability of the fuel cell as well, even if the temperature of the fuel cell is low at starting or the ambient temperature is low.

The present invention to address the above issues provides a fuel cell system, which comprises; a cooling line for cooling a fuel cell with the cooling fluid circulating between the fuel cell and a heat exchanger; one humidifying apparatus of water permeable membrane type, which humidifies the oxidant gas supplied to the cathode inlet by means of a moisture exchange with the moisture rich cathode off-gas discharged from the cathode outlet of the fuel cell; another humidifying apparatus of water permeable membrane type, which humidifies the fuel gas supplied to the anode inlet by means of a moisture exchange with the moisture rich off-gas discharged from the outlet of the anode or cathode of the fuel cell; a heating device for heating the oxidant and fuel gases with the cooling fluid of the cooling line, which absorbs the heat from the fuel cell and flows into the heat exchanger.

In the fuel cell system according to the present invention, when the oxidant gas is supplied to the cathode inlet and the fuel gas is supplied to the anode inlet on its starting, it starts generating electric power and discharging the moisture rich residual cathode off-gas from the cathode outlet and the moisture rich anode off-gas from the anode outlet. This moisture rich cathode off-gas and the oxidant gas supplied to the cathode inlet exchange the moisture in the humidifying apparatus of water permeable membrane thus the discharged cathode off-gas dehumidified and the supplied oxidant gas humidified. Similarly, the moisture rich off-gas discharged from the outlet of the anode or cathode and the fuel gas supplied to the anode inlet exchange the moisture in the humidifying apparatus of water permeable membrane, thus the discharged off-gas dehumidified and the supplied fuel gas humidified. The cooling fluid of the cooling line circulates between the fuel cell and the heat exchanger to control the temperature of the fuel cell. In so doing, the beating device heats the humidified oxidant gas supplied to the cathode inlet and the humidified fuel gas supplied to the anode gas respectively, utilizing the cooling fluid, which has absorbed the heat from the fuel cell and flows into the heat exchanger.

If the heating device is so arranged that it may heat the respective oxidant and fuel gases by heating their humidifying apparatus, it will be preferable to increase the humidification of the oxidant and fuel gases, since these humidifying apparatus can humidify the oxidant and fuel gases with the high dew-point temperatures.

The heating device may be arranged so that the oxidant gas is heated by one heat exchanger provided in the oxidant gas supplying path and the fuel gas by another heat exchanger in the fuel gas supplying path. In this case, if the respective heat exchangers are placed in the upstream of the respective humidifiers, it will be preferable to increase the humidification of the oxidant and fuel gases rapidly, since the dew-point temperatures can be raised by heating the oxidant and fuel gases supplied to the humidifying apparatus in advance.

The heating device may also be arranged so that it heats the oxidant gas through the intercooler provided in the upstream of the humidifying apparatus in the supplying path of the oxidant gas. This arrangement allows the rise of its dew-point temperature by raising the temperature of oxidant gas supplied to the humidifying apparatus in advance, thereby increasing the humidification of the oxidant gas by the humidifying apparatus rapidly. Also it obviates additional heat exchangers, enabling a compact fuel cell system. It would be preferable to prepare a switching device such as a three-way valve for the circulating path of the cooling fluid of the cooling line, which is capable of switching between the cooling fluid flowing into the heat exchanger after absorbing the heat from the fuel cell and the cooling fluid flowing into the fuel cell after radiating in the heat exchanger.

Further, the heating device may be arranged so that it heats the fuel gas by heating the ejector for water suction provided in the supplying path of the fuel gas. In this case, it would be preferable to increase the humidification of the fuel gas by the ejector for water suction, since the ejector for water suction prevents the temperature drop of the fuel gas caused by the latent heat of vaporization while it humidifies the fuel gas.

DESCRIPTION OF THE PREFERRED EMBODIMENTS

Figure 1:
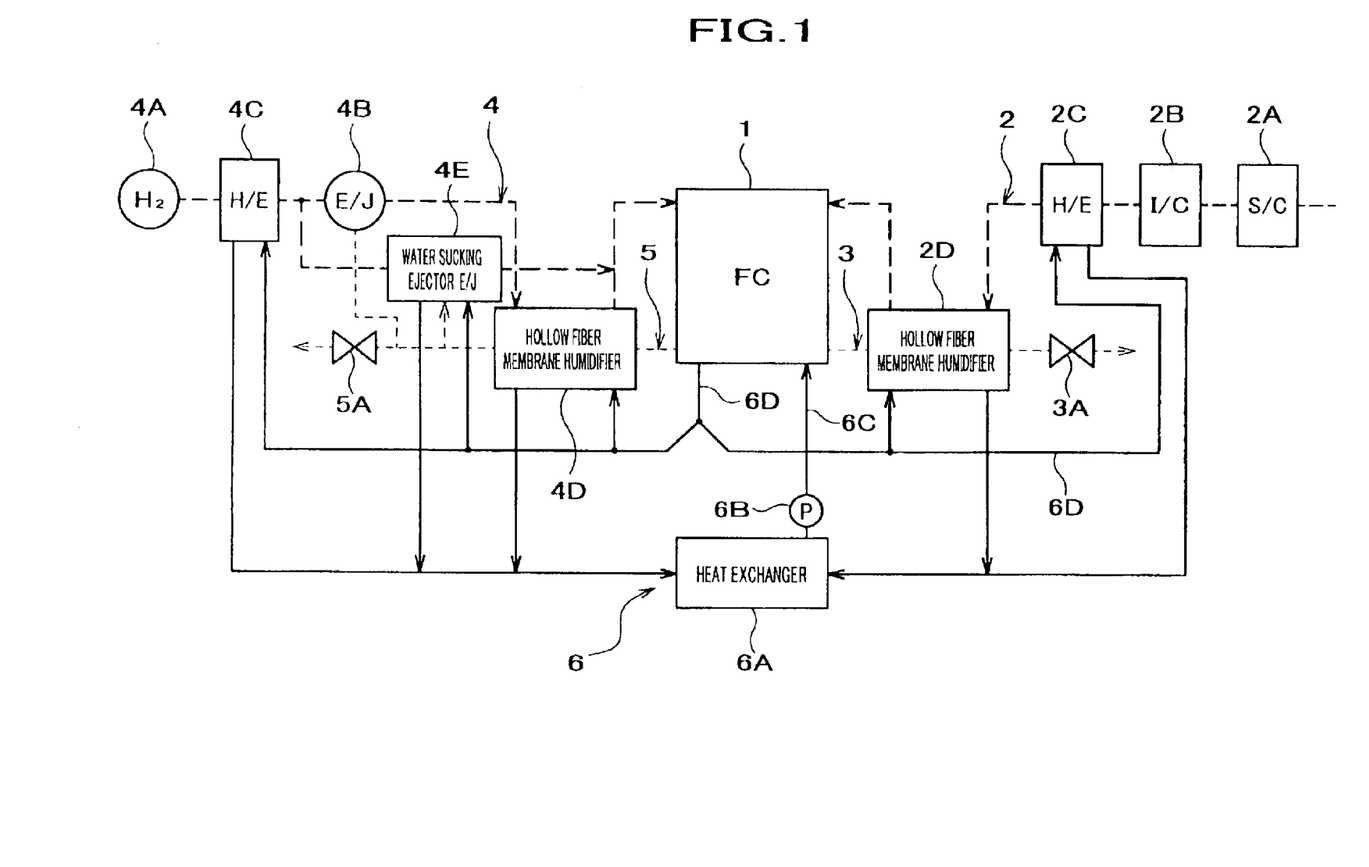
FIG. 1 is a block diagram illustrating the fuel cell system according to the first embodiment of the present invention.

The preferable embodiments according to the present invention will now be described with the reference to the accompanying drawings. FIG. 1 is a block diagram illustrating the fuel cell system according to the first embodiment of the present invention. The fuel system according to the first embodiment shown in FIG. 1 includes a fuel cell (FC) 1, an air supply line 2, an air discharge line 3, a hydrogen gas supply line 4, a hydrogen gas discharge line 5 and a cooling line 6. The system, for example, is mounted on a fuel cell electric vehicle as a power supply for the traction motor.

The fuel cell (FC) 1 is a PEM fuel cell, which has a large number of cells stacked and provides the most stable power generation under the temperature of 70 to 80 degrees Celsius. The fuel cell (FC) 1 is so arranged in a circuit that it supplies the electricity to the battery and the drive unit of the traction motor through the output current control unit (not shown).

The air supply line 2 supplies the a as an oxidant gas containing oxygen to the cathode inlet of the fuel cell (FC) 1. A supercharger (S/C) 2A and an intercooler (I/C) 2B are disposed in the direction of the upstream to downstream of the air supply line 2. And in the downstream of the intercooler (I/C) 2B are disposed a heat exchanger (H/E) 2C and a hollow fiber membrane humidifier 2D, which is a water permeable membrane humidifying apparatus, to heat and humidify the air supplied to the cathode inlet. In the upstream of the supercharger (S/C) 2A a silencer and an air filter (not shown) are disposed.

The air discharge line 3 discharges the moisture rich off-gas, the residual air containing the reaction water, though the cathode outlet of the fuel cell (FC) 1. In order to humidify the air supplied to the cathode inlet with the moisture rich cathode off-gas, the hollow fiber membrane humidifier 2D is provided in the air discharge line 3 and a discharge control valve 3A for the cathode off-gas is prepared in the downstream of the hollow fiber humidifier 2D.

The hydrogen gas supply line 4 circulates and supplies the hydrogen gas as a fuel gas to the anode inlet of the fuel cell (FC) 1. A hydrogen tank 4A and an ejector 4B are provided in the hydrogen gag supply line 4. A heat exchanger (H/E) 4C is placed in the upstream of the ejector 4B in order to heat the hydrogen gas supplied to the anode inlet. On the other hand, in the downstream of the ejector 4B is placed a hollow fiber membrane humidifier 4D to humidity, which is a water permeable membrane humidifier In parallel with the hollow fiber membrane humidifier 4D, between the downstream of the heat exchanger (H/E) 4C and the downstream of the hollow fiber membrane humidifier 4D is placed an ejector 4E for water suction (hereinafter in the description of the embodiment referred to as water sucking ejector 4E).

The ejector 4B and the water sucking ejector 4E are a sort of jet pump, which is arranged to produce negative pressure in the suction chamber by the pressure conversion of the main-flow speed with the diffuser and nozzle (not shown). It has the features of simple construction, easy operation/ maintenance and good durability. The ejector 4B sucks the anode off-gas discharged into the hydrogen gas discharge line 5 and circulates it to the hydrogen gas supply line 4. On the other hand, the water sucking ejector 4E sucks the condensed water in the anode off-gas discharged into the hydrogen gas discharge line 5 and circulates it back to the hydrogen gas supply line 4.

The hydrogen gas discharge line 5 discharges the moisture rich anode off-gas from the anode outlet of the fuel cell (FC) 1, which is the residual hydrogen gas containing the reaction water. In order to humidify the hydrogen gas supplied to the anode inlet with the moisture rich anode off-gas, the hollow fiber membrane humidifier 4D is placed in the hydrogen gas discharge line 5, and a discharge control valve 5A is provided in the downstream of the hollow fiber membrane humidifier 4D.

The cooling line 6 cools the fuel cell (FC) 1 within the appropriate temperature range with the cooling fluid, which circulates between the fuel cell (FC) 1 and a heat exchanger 6A. The cooling line 6 has, at the minimum, a cooling fluid outward path 6C, which sends the cooling fluid radiated by means of a heat exchanger 6A to the fuel cell (FC) 1 with a circulating pump 6B, and a cooling fluid homeward path 6D, which returns the cooling fluid absorbing the heat from the fuel cell (FC) 1 to the heat exchanger 6A. In this cooling line 6, a bypassing path (not shown) and a thermostat valve (not shown), which opens or closes the bypassing path according to the temperature set for the cooling fluid, are prepared to promote the warm-up of the fuel cell) (FC) 1 The setting temperature of opening the bypassing path is normally about 70 degrees Celsius and that of closing about 80 degrees Celsius.

When the cooling line 6 does not have the secondary cooling line shown in the figure, which has the circulating path of a second cooling fluid, the beat exchanger 6A includes a radiator, an air-cooling type (gas/liquid type), which is capable of performing the heat exchange with the atmosphere. When the cooling line 6 has the secondary cooling line possessing a radiator, the heat exchanger 6A includes a heat exchanger, a liquid-liquid type, which can perform the heat exchange with the secondary cooling fluid.

In order to prevent the liquid junction of the fuel cell (FC) 1, the pure water of the low electrical conductivity or the electrically non-conductive aqueous solution of ethylene glycol series is used for the cooling fluid, which circulates between the heat exchanger 6A and the fuel cell (FC) 1. The pipe materials of the cooling fluid outward and homeward paths 6C and 6D are composed of the synthetic resin pipes, which are excellent in electrical insulation and resistance to the ion solution.

In the fuel cell system according to the first embodiment, a heating means heats the air supplied to the cathode inlet and the hydrogen gas supplied to the anode inlet of the fuel cell system (FC) 1 by means of the cooling fluid of the cooling line 6, which absorbs the heat from the fuel cell (FC) 1 and flows into the heat exchanger 6A. In the cooling fluid homeward path 6D, which starts from the fuel cell (PC) 1 to the heat exchanger 6A, the piping is arranged so that the cooling fluid returns to the heat exchanger 6A after circulating through the hollow fiber membrane humidifier 2D and also returns to the heat exchanger 6A after circulating through the heat exchanger (H/E) 2C in order to beat the air passing through the air supply line. Similarly in the cooling fluid homeward path 6D, which starts from the fuel cell (FC) 1 to the heat exchanger 6A, the piping is arranged so that the cooling fluid returns to the heat exchanger 6A after circulating through the hollow fiber membrane humidifier 4D and also returns to the heat exchanger 6A after circulating through the heat exchanger (H/E) 4C, further returning to the heat exchanger 6A after circulating through the water sucking ejector 4E in order to heat the hydrogen gas passing through the hydrogen gas supply line 4.

The hollow fiber membrane humidifier 2D of the air supply line 2 has a hollow fiber membrane module, which houses many porous water permeable hollow fiber membranes in a bundle within the cylindrical housing The housing has the holes on its periphery at one end for guiding gas in and at the other end for discharging. One end of the hollow fiber membrane module is connected and held by one head block, which has the sweep gas guiding path and the off-gas discharging path The other end of it is connected and held by the other head block, which has the sweep gas discharging path and the off-gas guiding path. And the water jacket, the circulating path for the cooling fluid, is provided around the cylindrical housing of the hollow fiber membrane humidifier 2D.

In the hollow fiber membrane humidifier 2D, the dry air, which is forcefully fed to the cathode inlet of the fuel cell (FC) 1 by the supercharger (S/C) 2A of the air supply line 2, flows into the sweep gas guiding path of one head block and out of the sweep gas discharging path of the other head block passing inside the cylindrical housing as a sweep gag. Simultaneously, the moisture rich residual air, which is discharged from the cathode outlet of the fuel cell (FC) 1, flows into the off-gas guiding path and out of the off-gas discharging path passing inside the respective hollow fiber membranes of the bundle as an off-gas, in the opposite direction of the sweep gas flow. The cathode off-gas, the moisture rich residual air passing inside the respective hollow fiber membranes and the dry air passing over the outer surfaces of the respective hollow fiber membranes perform the moisture exchange between them, thus the moisture rich cathode off-gas of the air discharge line 3 dehumidified and the dry air of the air supply line 2 humidified.

The detailed structural explanation of the hollow fiber membrane humidifier 4D of the hydrogen gas supply line 4 would be omitted, since it is structurally the same as the hollow fiber membrane humidifier 2D. In this hollow fiber membrane humidifier 4D, the moisture rich residual hydrogen gas of the hydrogen gas discharge line 5 flows inside the respective hollow fiber membranes as an anode off-gas and the dry hydrogen gas of the hydrogen gas supply line 4 flows over the outer surfaces of the respective hollow fiber membranes as a sweep gas As a result, the moisture rich residual hydrogen gas is dehumidified and the dry hydrogen gas of the hydrogen gas supply line 4 is humidified.

The heat exchanger (H/E) 2C is the gas-liquid type heat exchanger, which performs the heat exchange between the air of the air supply line 2 and the cooling fluid of the cooling line 6. Similarly, the heat exchanger (H/E) 4C is the gas-liquid type heat exchanger, which performs the heat exchange between the hydrogen gas of the hydrogen gas supply line 4 and the cooling fluid of the cooling line 6. On the other hand, the water sucking ejector 4E sucks the condensed water in the anode off-gas, which is discharged from the anode outlet of the fuel cell (FC) 1 into the hydrogen gas discharge line 5 through the hollow fiber membrane humidifier 4D. The water sucking ejector 4E humidifies the dry hydrogen gas of the hydrogen gas supply line 4 by passing it through the diffuser and nozzle (not shown) to mix it with the sucked water. The water jacket of cooling fluid circulating path is provided around the water sucking ejector 4E.

In the fuel cell system according to the first embodiment arranged as described above, on starting it the air forcefully fed from the supercharger (S/C) 2A of the air supply line 2 is supplied to the cathode inlet of the fuel cell (FC) 1 through the intercooler (I/C) 2B, the heat exchanger (H/E) 2C and the hollow fiber membrane humidifier 2D. Simultaneously, the hydrogen gas of the hydrogen tank 4A of the hydrogen gas supply line 4 is supplied to the anode inlet of the fuel cell (FC) 1 through the heat exchanger (H/E) 4C, the ejector 4B and the hollow fiber membrane humidifier 4D The fuel cell (FC) 1 thus starts generating electric power, discharging the moisture rich residual air from the cathode outlet as a cathode off-gas and the moisture rich residual hydrogen gas from the anode outlet as an anode off-gas.

Once the fuel cell system starts, the moisture exchange is performed by the hollow fiber membrane humidifier 2D between the moisture rich cathode off-gas of the air discharge line 3, which is discharged from the cathode outlet of the fuel cell (FC) 1, and the air of the air supply line 2, which is supplied to the cathode inlet. Thus the cathode off-gas of the air discharge line 3 is dehumidified and the air of the air supply line 2 is humidified Similarly, the moisture exchange is performed by the hollow fiber membrane humidifier 4D between the moisture rich anode off-gas of the hydrogen gas discharge line 5, which is discharged from the anode outlet of the fuel cell (PC) 1, and the hydrogen gas of the hydrogen gas supply line 4, which is supplied to the anode inlet. Thus the anode off-gas of the hydrogen gas discharge line 5 is dehumidified and the hydrogen, gas of the hydrogen gas supply line 4 is humidified. The water sucking ejector 4B also humidifies the hydrogen gas of the hydrogen gas supply line 4 by sucking the water discharged into the hydrogen gas discharge line 5 and mixing it with the hydrogen gas.

The cooling fluid circulates between the fuel cell (FC) 1 and the heat exchanger 6A through the cooling fluid outward and homeward paths 6C and 6D so as to control the temperature of the fuel cell (FC) 1, when the operation of the circulating pump 6B of the cooling line 6 is started. The cooling fluid, which has absorbed the heat from the fuel cell (FC) 1, circulates through and heats the hollow fiber membrane humidifier 2D, the heat exchanger (H/E) 2C, the hollow fiber membrane humidifier 4D, the heat exchanger (H/E) 4C and the water sucking ejector 4E and returns to the heat exchanger 6A through the cooling fluid homeward path 6D. Therefore, the air passing through the air supply line 2 is heated by the hollow fiber membrane humidifier 2D and the heat exchanger (H/E) 2C. Similarly, the hydrogen gas passing through the hydrogen gas supply line 4 is heated by the hollow fiber membrane humidifier 4D, the heat exchanger (H/E) 40 and the water sucking ejector 4E.

The fuel cell system according to the first embodiment allows maintaining the temperatures of the air supplied to the cathode inlet and the hydrogen gas supplied to the anode inlet approximately the same as that of the fuel cell (FC) 1, even if the temperature of fuel cell (FC) 1 is low at starting or the ambient temperature is low. Also it prevents the decrease in humidification of the air and hydrogen as by avoiding their dew-point temperature drops Consequently, the decrease in the power generation of the fuel cell (FC) 1 can be prevented and the degradation of durability of the fuel cell (FC) 1 as well.

The heat exchanger (H/E) 2C the upstream heats the air in advance, which is supplied to the hollow fiber membrane humidifier 2D of the air supply line 2, and the hollow fiber membrane humidifier 2D further heats it up. Thus the hollow fiber membrane humidifier 2D is capable of humidifying the air with the high dew-point temperature, enabling the increase of humidification Similarly, the heat exchanger (H/E) 4C in the upstream heats the hydrogen gas in advance, which is supplied to the hollow fiber membrane humidifier 4D of the hydrogen gas supply line 4. Thus the hollow fiber membrane humidifier 4D is capable of humidifying the hydrogen gas with the high dew-point temperature, enabling the increase of humidification. The temperature drop of the hydrogen gas resulting from the latent heat of vaporization at humidification can be prevented, since the water sucking ejector 4E is heated As a result, the dew-point temperature of the hydrogen gas in the water sucking ejector 4E increases, promoting the humidification of the hydrogen gas by the water sucking sector 4E.

Figure 2:
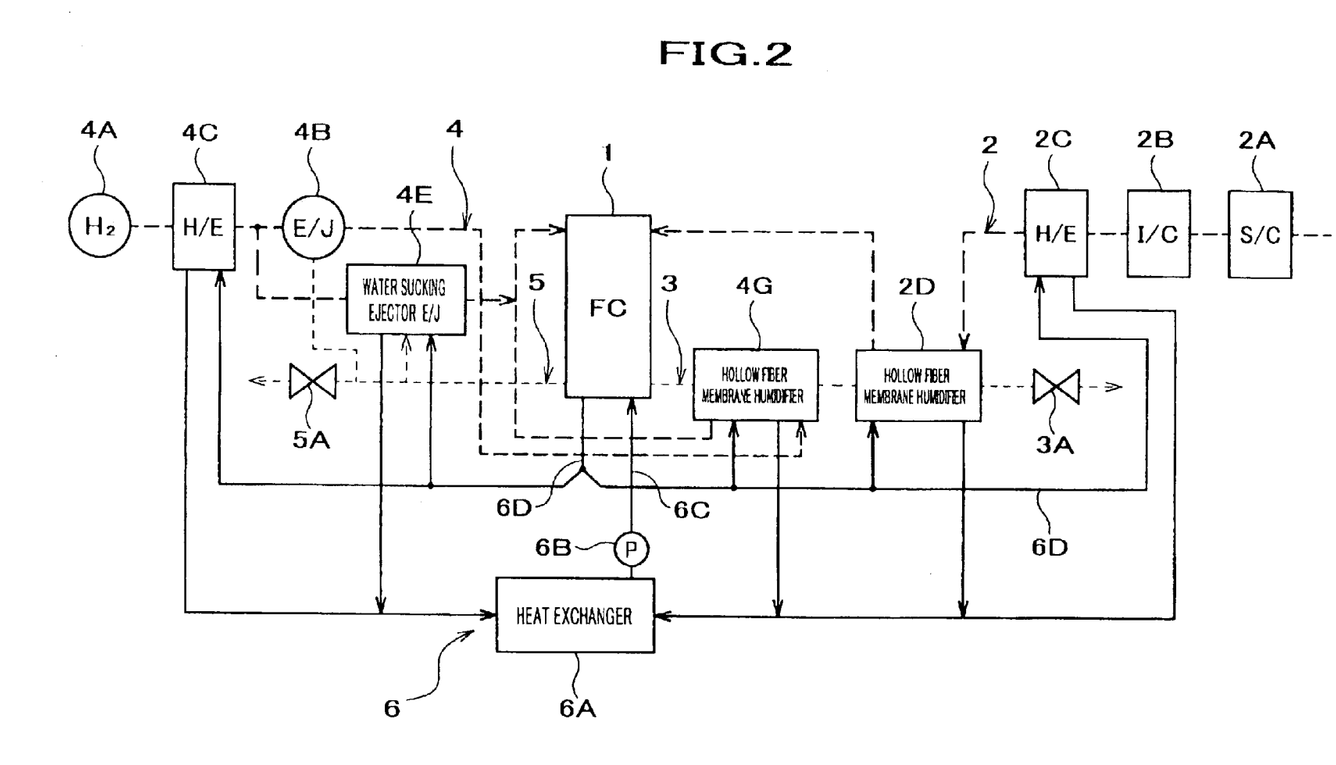
FIG. 2 is a block diagram illustrating the fuel cell system according to the second embodiment of the present invention.

The fuel cell system according to the second embodiment of the invention will be described with the reference to FIG. 2. The fuel cell system according to the second embodiment differs from that according to the first embodiment in that the hollow fiber membrane humidifier 4D is replaced with 4G The hollow fiber membrane humidifier 4G is laid across the hydrogen gas supply line 4 and the air discharge line 3, on the other hand the hollow fiber membrane humidifier 4D is laid across the hydrogen gas supply line 4 and the hydrogen gas discharge line 5. As the fuel cell system according to the second embodiment is the same as that according to the first embodiment except for the one described above, detailed explanations would be omitted, bearing the same symbols.

The hollow fiber membrane humidifier 4G of the fuel cell system according to the second embodiment is arranged so that the moisture rich residual air of the air discharge line 3, which is discharged from the cathode outlet of the fuel cell (FC) 1, passes inside the respective hollow fiber membranes of the bundle as an off-gas, and the dry hydrogen gas, which is sent from the ejector 4B of the hydrogen gas supply line 4, passes over the outer surfaces of the respective hollow fiber membranes as a sweep gas. Each hollow fiber membrane of the hollow fiber membrane humidifier 4G is of a non-porous type, which is permeable not to gases such as oxygen but only to the moisture by ion hydration. The piping of the cooling fluid homeward path 6D of the cooling line 6 is so arranged that the cooling fluid circulates through the hollow fiber membrane humidifier 4G and returns to the heat exchanger 6A so as to heat the hydrogen gas of the hydrogen gas supply line 4 passing through the hollow fiber membrane humidifier 4G.

In the fuel cell system according to the second embodiment, the moisture exchange is performed between the moisture rich cathode off-gas of the air discharge line 3, which is discharged from the cathode outlet of the fuel cell (FC) 1 and the hydrogen gas of the hydrogen gas supply line 4, which is supplied to the anode inlet. The hollow fiber membrane humidifier 4G interrupts the permeation of the oxygen contained in the cathode off-gas and makes only the moisture in the cathode off-gas permeate through the respective non-porous hollow fiber membranes by ion hydration. With this permeated moisture the dry hydrogen gas of the hydrogen gas supply line 4 is humidified. The cooling fluid of the cooling line 6, which has absorbed the heat from the fuel cell (FC) 1, circulates through the hollow fiber membrane humidifier 4G through the cooling fluid homeward path 6D, thus heating the hydrogen gas passing through the hydrogen gas supply line 4 through the hollow fiber membrane humidifier 4G.

It is anticipated that the fuel cell system according to the second embodiment will attain the same effects as those according to the first embodiment so long as the construction is the see between them. So, the fuel system according to the second embodiment allows maintaining the temperatures of the air supplied to the cathode inlet and the hydrogen gas supplied to the anode inlet approximately the same as that of the fuel cell (FC) 1, even if the temperature of fuel cell (FC) 1 is low at starting or the ambient temperature is low. Also it prevents the decrease in humidification of the air and hydrogen gas by avoiding their dew-point temperature drops. Consequently, the decrease in the power generation of the fuel cell (FC) 1 can be prevented and the degradation of the durability of the fuel cell (FC) 1 as well.

Figure 3:
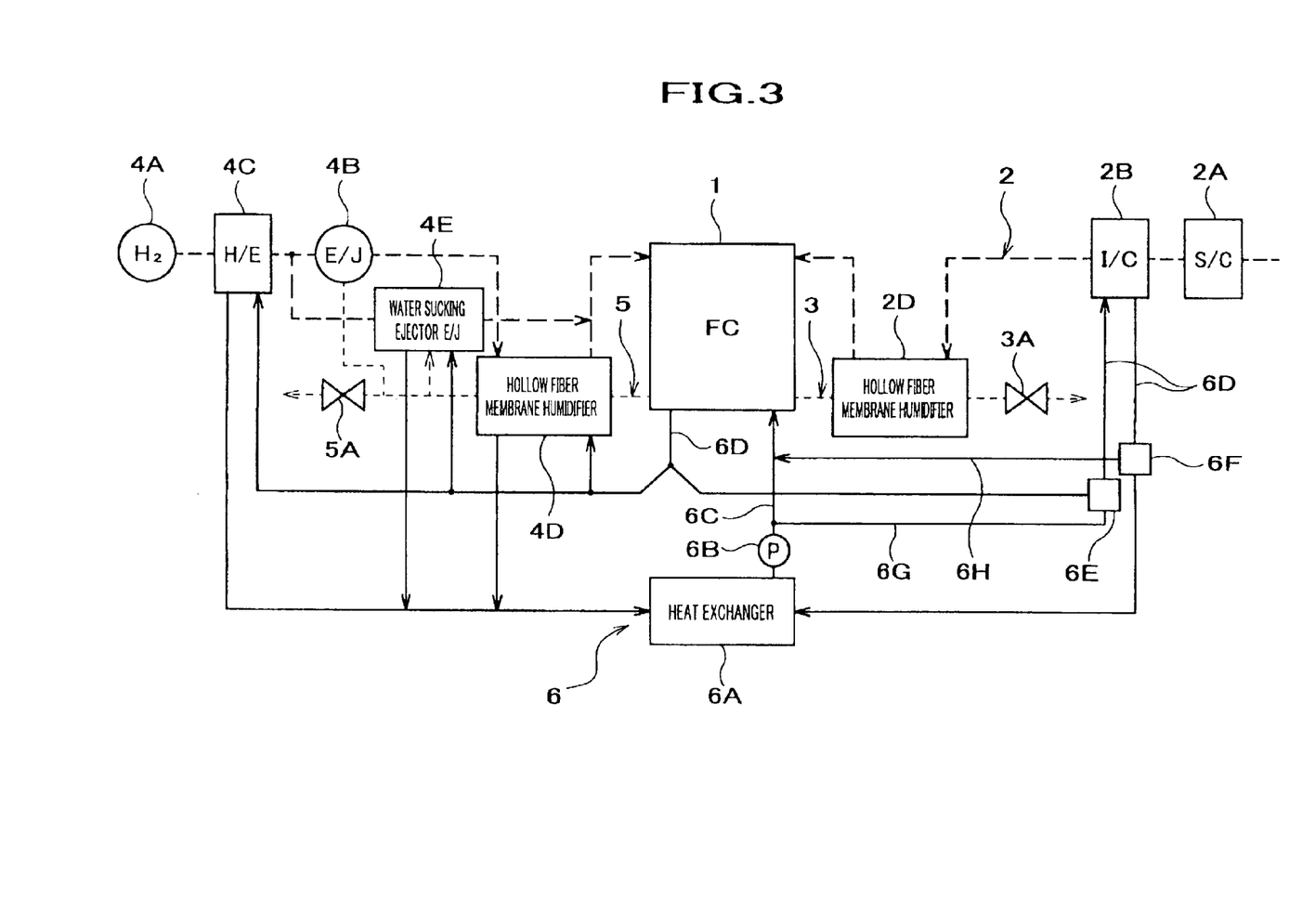
FIG. 3 is a block diagram illustrating the fuel cell system according to the third embodiment of the present invention.

The fuel cell system according to the third embodiment of the invention will be described with reference to FIG. 3. The fuel cell system according to the third embodiment differs from that according to the first embodiment in that the heat exchanger (H/E) 2C is deleted from the air supply line 2 and the arrangement of the cooling fluid outward and homeward paths 6C and 6D is modified. As the fuel cell system according to the third embodiment is the same as that according to the first embodiment except for those described above, detailed explanations would be omitted, bearing the same symbols.

In the fuel cell system according to the third embodiment, the piping of the cooling fluid homeward path 6D of cooling line 6 is so arranged that the cooling fluid returns to the heat exchanger 6A, not circulating through the hollow fiber membrane humidifier 2D but circulating through the intercooler (I/C) 2B. In the cooling fluid homeward path 6D, one three-way valve 6E is placed on the way from the fuel cell (FC) 1 to the intercooler (I/C) 2B, and another three-way valve 6F is placed on the way from the intercooler (I/C) 2B to the heat exchanger 6A. In the downstream of a circulating pump 6B is provided a diverging path 6G, which diverges from the cooling fluid outward path 6C and is connected to the three-way valve 6E, and a merging path 6H, which diverges from the three-way valve 6F and merges with the cooling fluid outward path 6C, in order that the cooling fluid supplied from the circulating pump 6B can circulate through the intercooler (I/C) 2B.

When the temperature of the fuel cell (FC) 1 is low at starting or the ambient temperature is low, the three-way valve 6E closes the diverging path 6G and opens the cooling fluid homeward path 6D from the fuel cell (FC) 1 to the intercooler (I/C) 2B; and the three-way valve 6F closes the merging path 6H and switches to open the cooling fluid homeward path 6D from the intercooler (I/C) 2B to the heat exchanger 6A. Thus the cooling fluid of the cooling fluid homeward path 6D circulates through the intercooler (I/C) 2B. The air of the air supply line 2, which is supplied to the hollow fiber membrane humidifier 2D by the supercharger (S/C) 2A is heated by the cooling fluid of the cooling fluid homeward path 6D through the intercooler 2B, which hag absorbed the heat from the fuel cell (FC) 1. Therefore, the hollow fiber membrane humidifier 2D can humidify the air with the high dew-point temperature, increasing the humidification of the air.

When the warm-up of the fuel cell (FC) 1 has been completed, the three-way valve 6E connects the diverging path 6G to the cooling fluid homeward path 6D heading for the intercooler (I/C) 2B, and the three-way valve 6F switches to connect the cooling fluid homeward path 6D, which comes from the intercooler (I/C) 2B to the merging path 6H Subsequently, the cooling fluid, which the circulating pump 6B pumps out, is circulated in the intercooler (I/C) 2B.

It is anticipated that the fuel cell system according to the third embodiment will attain the same effects as those according to the first embodiment. So, the fuel cell system according to the third embodiment allows maintaining the temperatures of the air supplied to the cathode inlet and the hydrogen gas supplied to the anode inlet approximately the same as that of the fuel cell (FC) 1, even if the temperature of fuel cell (FC) 1 is low at starting or the ambient temperature is low. Also it prevents the decrease in humidification of the air and hydrogen gas by avoiding their dew-point temperature drops. Consequently, the decrease in the power generation of the fuel cell (FC) 1 can be prevented and the degradation of the durability of the fuel cell (FC) 1 as well.

Figure 4:
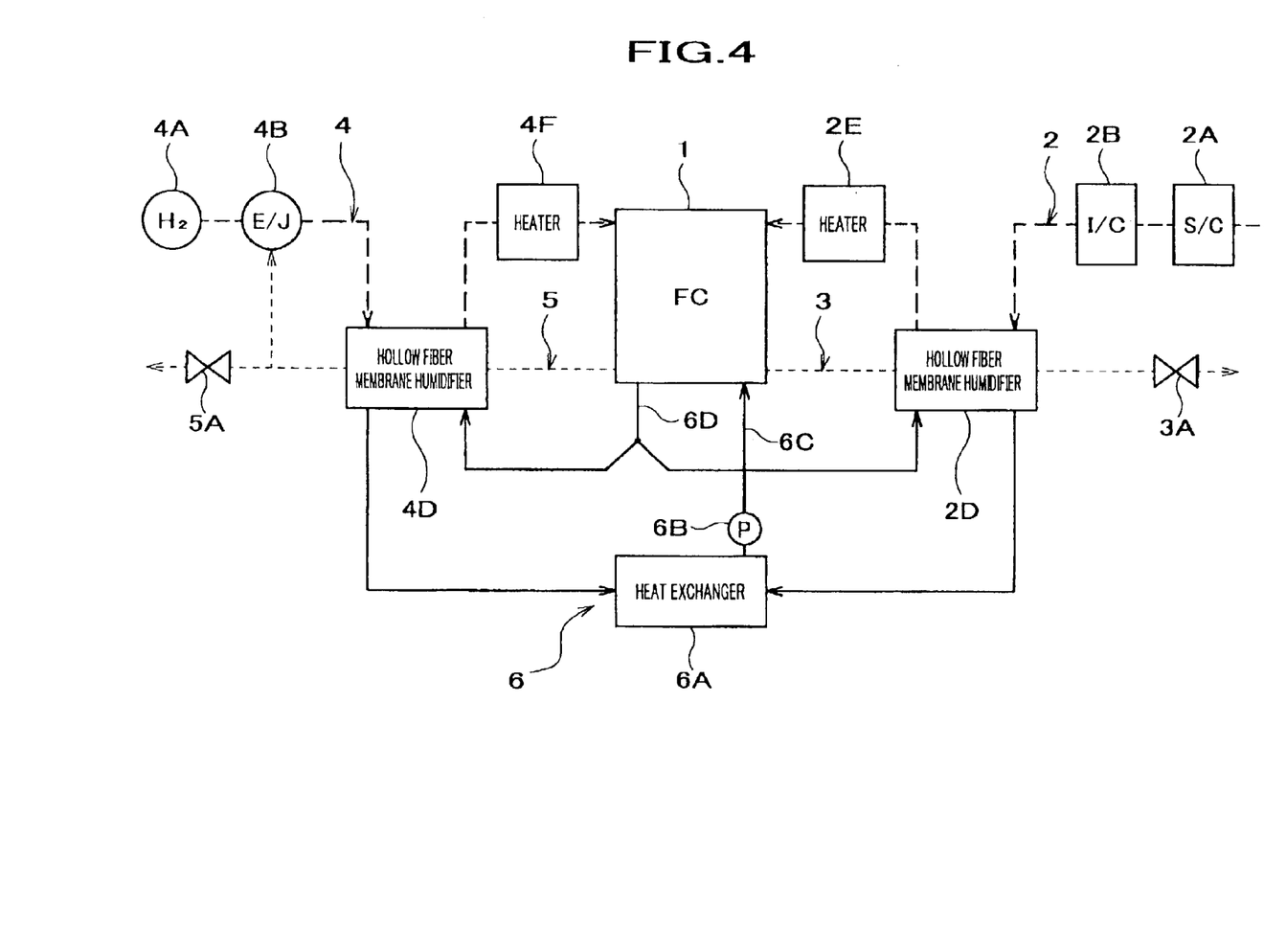
FIG. 4 is a block diagram illustrating the fuel cell system according to the fourth embodiment of the present invention.

The fuel cell system according to the fourth embodiment of the invention will be described with reference to FIG. 4. The fuel cell system according to the fourth embodiment differs from that according to the first embodiment in that the heat exchanger (H/E) 2C is deleted from the air supply line 2, the heat exchanger (H/E) 4C and the water sucking ejector 4E are deleted from the hydrogen gas supply line 4; and the arrangement of the cooling fluid homeward path 6D of the cooling line 6 is modified accordingly. A heater 2E such as an electrical heater is provided in the downstream of the hollow fiber membrane humidifier 2D of the air supply line 2 and a heater 4F of the similar type is provided in the downstream of the hollow fiber membrane humidifier 4D of the hydrogen gas supply line 4. As the fuel cell system according to the fourth embodiment is the same as that according to the first embodiment except for those described above, detailed explanations would be omitted, bearing the same symbols.

When the temperature of the fuel cell (FC) 1 is low at starting or the ambient temperature is low, the air, which is supplied to the cathode inlet of the fuel cell (FC) 1 by the supercharger (S/C) 2A of the air supply line 2, is heated by the heater 2E just after it has been humidified by the hollow fiber membrane humidifier 2D. The hydrogen gas, which is supplied to the anode inlet of the fuel cell (FC) 1 from the hydrogen tank 4A, is heated by the heater 4F just after it has been humidified by the hollow fiber membrane humidifier 4D. Thus, the temperatures of the air and hydrogen gas supplied to the fuel cell (FC) 1 are raised, and also the resultant increases in dew-point temperatures allow the evaporation of condensed moisture, thereby increasing the humidification of the a and hydrogen gas.

It is anticipated that the fuel cell system according to the fourth embodiment will attain the same effects as those according to the first embodiment so long as the construction is the same between them. So, the fuel system according to the fourth embodiment allows maintaining the temperatures of the air supplied to the cathode inlet and the hydrogen gas supplied to the anode Let approximately the same as that of the fuel cell (FC) 1, even if the temperature of fuel cell (FC) 1 is low at starting or the ambient temperature is low. Also it prevents the decrease in humidification of the air and hydrogen gas by avoiding their dew-point temperature drops. Consequently, the decrease in the power generation of the fuel cell (FC) 1 can be prevented and the degradation of durability of the fuel cell (FC) 1 as well The hollow fiber membrane humidifiers 2D and 4D according to the first, third or fourth embodiment may employ non-porous hollow fiber membranes of ion hydration to form a bundle of hollow fiber membranes, like the hollow fiber membrane humidifier 4G of the fuel cell system according to the second embodiment. This type of non-porous hollow fiber membrane permits only the permeation of the moisture in the gas by ion hydration and prevents the permeation of other gag contents NAFION (RTM) of Du Pont is known as one of the examples.

What is claimed is:

1. A fuel cell system comprising:
   a cooling line for cooling a fuel cell with a cooling fluid circulating between a fuel cell and a heat exchanger;
   a first water permeable membrane type humidifying apparatus for humidifying an oxidant gas supplied to a cathode inlet by exchanging moisture with a moisture rich cathode off-gas discharged from a cathode outlet of the fuel cell;
   a second water permeable membrane type humidifying apparatus for humidifying a fuel gas supplied to an anode inlet by exchanging moisture with a moisture rich off-gas discharged from an outlet of an anode or a cathode of the fuel cell; and
   a heating device for heating said oxidant and fuel gases with the cooling fluid in said cooling line, which absorbs heat from said fuel cell and flows into the heat exchanger.

2. The fuel cell system according to claim 1, wherein;
   said heating device heats the respective oxidant and fuel gases by heating the first humidifying apparatus and the second humidifying apparatus.

3. The fuel cell system according to claim 1, wherein;
   said heating device heats the respective oxidant and fuel gases through a heat exchanger provided in a supply path of said oxidant gas and another heat exchanger provided in a supply path of said fuel gas.

4. The fuel cell system according to claim 1, wherein;
   said heating device heats the oxidant gas through an intercooler provided in an upstream portion of said first humidifying apparatus in a supply path of said oxidant.

5. The fuel cell system according to claim 3, wherein;
   said heating device heats the oxidant gas through an intercooler provided in an upstream portion of said first humidifying apparatus in a supply path of said oxidant gas.

6. The fuel cell system according to claim 1, wherein;
   said heating device heats the fuel gas through an ejector for sucking water provided in a supply path of said fuel gas.

7. The fuel cell system according to claim 3, wherein;
   said heating device heats the fuel gas through an ejector for sucking water provided in a supply path of said fuel gas.

8. The fuel cell system according to claim 4, wherein;
   said heating device heats the fuel gas through an ejector for sucking water provided in a supply path of said fuel gas.

* * * * *